(12) United States Patent
Tamura et al.

(10) Patent No.: US 10,073,415 B1
(45) Date of Patent: Sep. 11, 2018

(54) DEVELOPING DEVICE, IMAGE FORMING APPARATUS, AND AIRFLOW CONTROLLING DEVICE

(71) Applicant: FUJI XEROX CO., LTD., Tokyo (JP)

(72) Inventors: Kazuya Tamura, Kanagawa (JP); Koji Udagawa, Kanagawa (JP); Masafumi Kudo, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/697,685

(22) Filed: Sep. 7, 2017

(30) Foreign Application Priority Data

Mar. 9, 2017 (JP) .................. 2017-044839

(51) Int. Cl.
*G03G 21/20* (2006.01)
*G03G 15/08* (2006.01)
*H04N 1/00* (2006.01)
*G03G 15/01* (2006.01)

(52) U.S. Cl.
CPC ....... *G03G 21/206* (2013.01); *G03G 15/0887* (2013.01); *G03G 21/203* (2013.01); *H04N 1/00992* (2013.01); *G03G 15/0173* (2013.01); *G03G 15/0846* (2013.01)

(58) Field of Classification Search
CPC .................................................. G03G 21/206
See application file for complete search history.

(56) References Cited

U.S. PATENT DOCUMENTS 8,731,429 B2   5/2014 Asami
2007/0009283 A1* 1/2007 Shirakata ............. G03G 21/206
                                                     399/92

FOREIGN PATENT DOCUMENTS

JP   2011-022296 A   2/2011
JP   2012-123193 A   6/2012

* cited by examiner

*Primary Examiner* — Clayton E Laballe
*Assistant Examiner* — Jas Sanghera
(74) *Attorney, Agent, or Firm* — Sughrue Mion, PLLC

(57) ABSTRACT

A developing device includes a developing unit, a rotating member that rotates in a predetermined direction to generate an airflow in a space that accommodates the developing unit, and first and second partitioning members. The first partitioning member is disposed between the developing unit and the rotating member, and has first and second openings that are each provided with an opening-closing mechanism and respectively disposed at upstream and downstream sides in a direction of the airflow generated when the rotating member rotates in the predetermined direction. The second partitioning member is disposed between the developing unit and an external space, and has third and fourth openings that are each provided with an opening-closing mechanism and respectively disposed at downstream and upstream sides in the direction of the airflow generated when the rotating member rotates in the predetermined direction.

12 Claims, 4 Drawing Sheets

DEVELOPING DEVICE, IMAGE FORMING APPARATUS, AND AIRFLOW CONTROLLING DEVICE

CROSS-REFERENCE TO RELATED APPLICATIONS

This application is based on and claims priority under 35 USC 119 from Japanese Patent Application No. 2017-044839 filed Mar. 9, 2017.

BACKGROUND

(i) Technical Field

The present invention relates to a developing device, an image forming apparatus, and an airflow controlling device.

(ii) Related Art

A developing device that performs a developing operation by using developer containing toner in an electrophotographic image forming apparatus is known.

SUMMARY

According to an aspect of the invention, there is provided a developing device including a developing unit, a rotating member, a first partitioning member, and a second partitioning member. The rotating member rotates in a predetermined direction to generate an airflow in a space that accommodates the developing unit. The first partitioning member is disposed between the developing unit and the rotating member, and has a first opening and a second opening. The first opening is provided with an opening-closing mechanism and disposed at an upstream side in a direction of the airflow generated when the rotating member rotates in the predetermined direction. The second opening is provided with an opening-closing mechanism and disposed at a downstream side in the direction of the airflow generated when the rotating member rotates in the predetermined direction. The second partitioning member is disposed between the developing unit and an external space, and has a third opening and a fourth opening. The third opening is provided with an opening-closing mechanism and disposed at a downstream side in the direction of the airflow generated when the rotating member rotates in the predetermined direction. The fourth opening is provided with an opening-closing mechanism and disposed at an upstream side in the direction of the airflow generated when the rotating member rotates in the predetermined direction.

BRIEF DESCRIPTION OF THE DRAWINGS

An exemplary embodiment of the present invention will be described in detail based on the following figures, wherein.

DETAILED DESCRIPTION

Exemplary Embodiment

Figure 1:
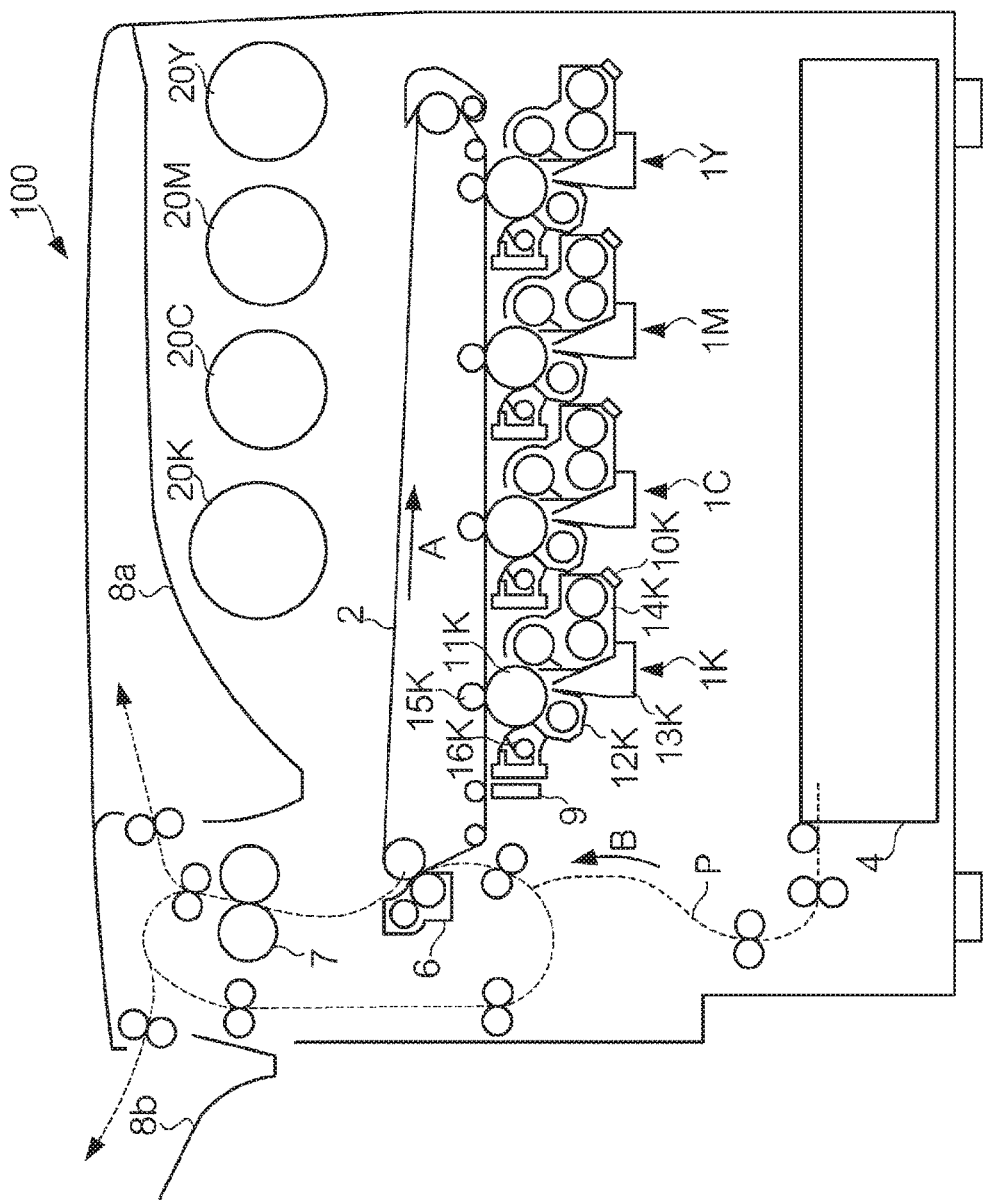
FIG. 1 is a schematic diagram illustrating the structure of an image forming apparatus according to an exemplary embodiment of the present invention.

An exemplary embodiment of the present invention will now be described. FIG. 1 is a schematic diagram illustrating the structure of an image forming apparatus 100 according to an exemplary embodiment of the present invention. FIG. 1 illustrates the cross-sectional structure of the image forming apparatus 100 viewed from the front. The image forming apparatus 100 is an electrophotographic image forming apparatus that has, for example, printing, copying, and facsimile functions, and forms an image corresponding to image data on a paper sheet that serves as an example of a medium. Image forming units 1Y, 1M, 1C, and 1K respectively form yellow (Y), magenta (M), cyan (C), and black (K) images. An intermediate transfer belt 2 is wrapped around plural rollers, and is rotated by the rollers in the direction of arrow A. The images formed by the image forming units 1Y, 1M, 1C, and 1K are transferred onto the outer peripheral surface of the intermediate transfer belt 2 in a superposed manner in a first transfer process.

A storage unit 4 stores plural paper sheets. Each paper sheet is fed from the storage unit 4 and transported by plural transport rollers along a transport path P in the direction of arrow B. A transfer device 6 performs a second transfer process for transferring the images that have been transferred to the intermediate transfer belt 2 in the first transfer process onto the paper sheet. A fixing device 7 fixes the images that have been transferred to the paper sheet in the second transfer process to the paper sheet by applying heat and pressure. The paper sheet to which the images have been fixed is transported by plural transport rollers and discharged to a discharge unit 8a or a discharge unit 8b.

The structure of the image forming unit 1K will be described as an example of the structures of the image forming units 1Y, 1M, 1C, and 1K. The image forming unit 1K includes a photoconductor 11K that serves as an image carrier; a charging device 12K that charges the photoconductor 11K to a predetermined charge potential; an exposure device 13K that forms an electrostatic latent image by exposing the photoconductor 11K to light in accordance with black (K) image data included in YMCK image data; a developing device 14K that forms a black image on the surface of the photoconductor 11K by developing the electrostatic latent image with black toner; a first transfer roller 15K that performs the first transfer process for transferring the image onto the intermediate transfer belt 2; and a cleaning device 16K that removes toner that remains on the surface of the photoconductor 11K after the first transfer process.

The developing device 14K contains developer including toner, which is non-magnetic, and carrier, which is magnetic, and develops the above-described electrostatic latent image by supplying the toner included in the developer to the electrostatic latent image. The developing device 14K is connected to a toner-supplying unit 20K by a supply path (not shown), and the toner is supplied from the toner-supplying unit 20K to the developing device 14K as necessary. A developing unit 141 includes a developer container, a developing roller, and a stirring roller, and the longitudinal direction thereof is perpendicular to the plane of FIG. 1.

The image forming units 1Y, 1M, and 1C have structures similar to that of the image forming unit 1K except that they form images of different colors among Y, M, C, and K. Therefore, description of the structures of the image forming units 1Y, 1M, and 1C will be omitted. In the following description, when it is not necessary to distinguish between the structures of the image forming units 1Y, 1M, 1C, and 1K, the letters "K", "Y", "M", and "C" are not attached to the reference numerals. For example, the photoconductor of the image forming unit 1Y is referred to as "photoconductor 11Y", and the photoconductor of any one of the photoconductors 11Y, 11M, 11C, and 11K is referred to simply as "photoconductor 11".

Figure 2:
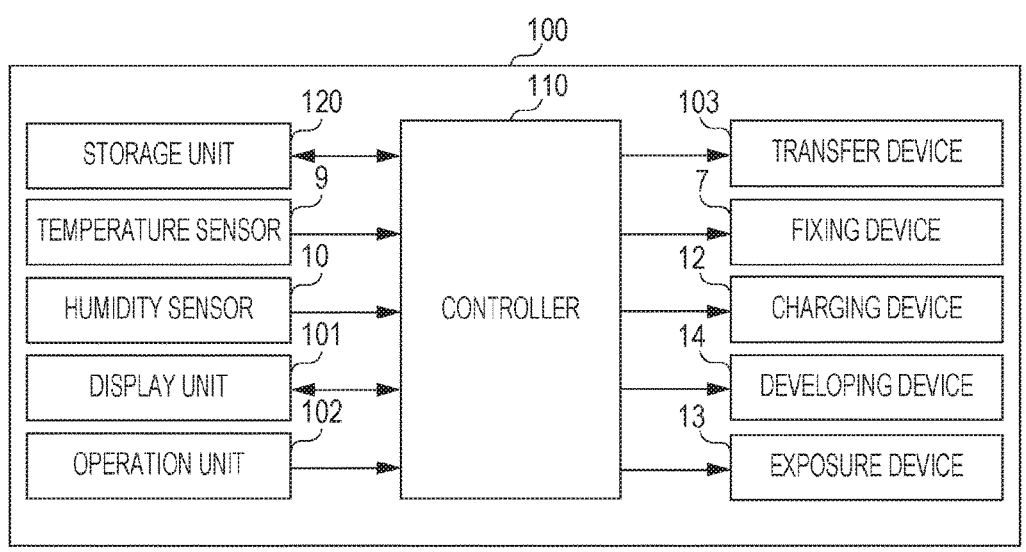
FIG. 2 is a block diagram illustrating the hardware structure of the image forming apparatus.

The hardware structure of the image forming apparatus 100 will now be described with reference to the block diagram of FIG. 2. The controller 110 includes a central processing unit (CPU), a read only memory (ROM), a random access memory (RAM), and an application specific integrated circuit (ASIC). The CPU executes programs stored in the ROM or a storage unit 120 to control a display unit 101, an operation unit 102, a transfer device 103, a fixing device 7, a charging device 12, a developing device 14, and an exposure device 13. The transfer device 103 includes the first transfer rollers 15 that perform the first transfer process, the intermediate transfer belt 2, and the transfer device 6 that performs the second transfer process. The storage unit 120 is, for example, a hard disk, and stores the above-described programs and a group of data including thresholds used when the controller 110 executes operations. A temperature sensor 9 measures the temperature in or around the developing device 14. A humidity sensor 10 measures the humidity in or around the developing device 14.

Figure 3:
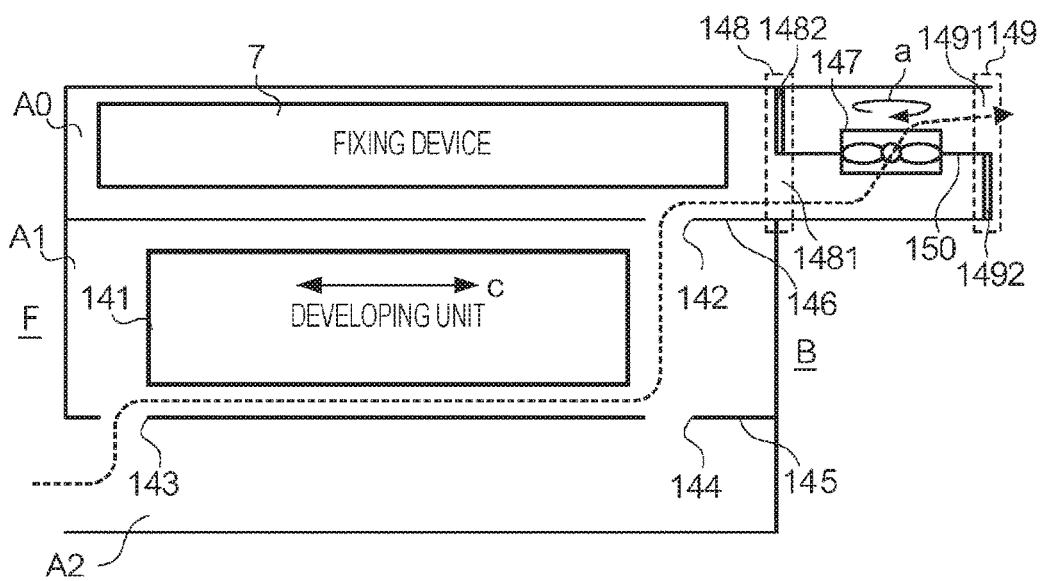
FIG. 3 is a schematic diagram illustrating the cross-sectional structure of the image forming apparatus and an airflow.
Figure 4:
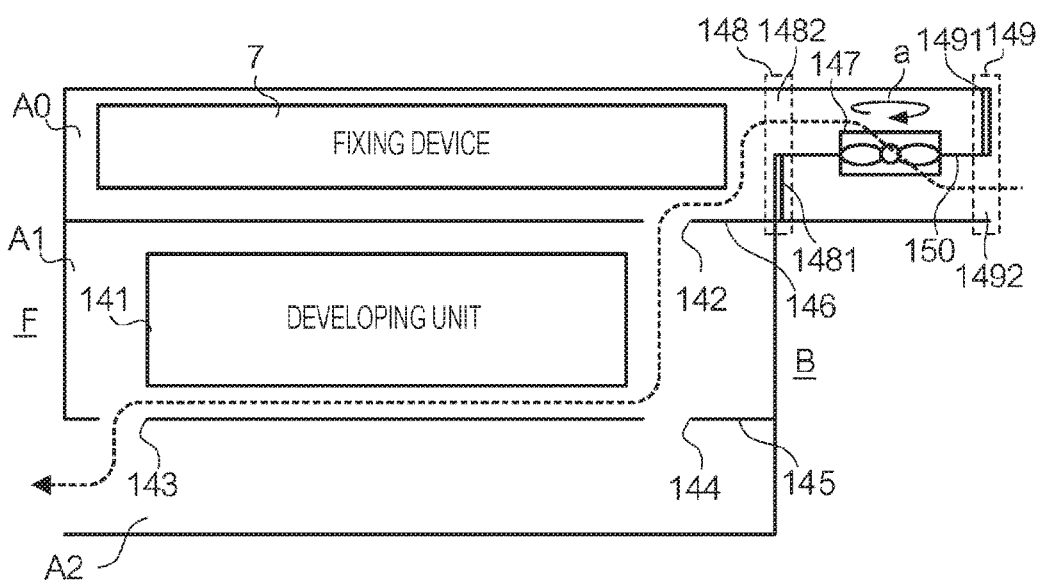
FIG. 4 is a schematic diagram illustrating the cross-sectional structure of the image forming apparatus and an airflow.

FIGS. 3 and 4 are schematic diagrams illustrating the cross-sectional structure around the developing device 14 along the vertical direction and an airflow. The front of the image forming apparatus 100 is indicated by 'F', and the back of the image forming apparatus 100 is indicated by 'B'. The developing unit 141 is disposed in the developing device 14. The developing unit 141 includes a developer container, a developing roller, and a stirring roller, and performs a developing process by supplying the toner contained in the developer to the electrostatic latent image. The image forming apparatus 100 includes a housing in which a space A0 accommodating the fixing device 7 is partitioned from a space A1 accommodating the developing unit 141 by a plate-shaped partitioning member 146, and the space A1 accommodating the developing unit 141 is partitioned from a space A2 free from the developing unit 141 by a plate-shaped partitioning member 145. The partitioning member 146 has an opening 142 at a position near the back (B) surface. The partitioning member 145 has openings 143 and 144. The opening 143 is relatively close to the front (F) surface, and the opening 144 is relatively close to the back (B) surface. The space A2 is connected to the space in front thereof (F) by an opening.

A rotating member 147 is disposed in the back (B) of the image forming apparatus 100. The rotating member 147 is a fan or the like that rotates in a predetermined direction a to generate an airflow in a direction that crosses the longitudinal direction c of the developing unit 141. In this example, the rotational axis of the rotating member 147 extends vertically, and the longitudinal direction c of the developing unit 141 is horizontal. When the rotating member 147 rotates in direction a, a vertically upward airflow is generated by the rotating member 147. The space above the rotating member 147 and the space below the rotating member 147 are partitioned from each other by a partitioning member 150.

A first partitioning member 148 is disposed between the developing unit 141 and the rotating member 147. The first partitioning member 148 has a first opening 1481 in a vertically lower region thereof, and a second opening 1482 in a vertically upper region thereof.

A second partitioning member 149 is disposed between the developing unit 141 and the external space at the back (B). The second partitioning member 149 has a third opening 1491 in a vertically upper region thereof, and a fourth opening 1492 in a vertically lower region thereof.

Each of the openings 1481, 1482, 1491, and 1492 is provided with an opening-closing mechanism capable of opening and closing the open region with a shutter member. The opening-closing mechanisms are driven by, for example, a solenoid.

As described above, when the rotating member 147 rotates in direction a, a vertically upward airflow is generated by the rotating member 147. Accordingly, when the first opening 1481 and the third opening 1491 are open and the second opening 1482 and the fourth opening 1492 are closed, an airflow that flows from the front (F) region to the back (B) region is generated in the developing device 14, that is, in the space accommodating the developing unit 14, as shown by the broken line arrow in FIG. 3. The airflow flows from the front (F) region, passes through the opening 143 in the upward direction, and flows along the broken line to the bottom portion of the developing unit 141. Then, the airflow flows in the longitudinal direction of the developing unit 141, and is discharged through the openings 1481 and 1491 to the back (B) region. Thus, the airflow accelerates heat dissipation from the entire region of the bottom portion of the developing unit 141, and the cooling effect is increased. In this case, the locations of the openings 1481 and 1482 may be described in relation to the direction of the airflow as follows: The first partitioning member 148 has the first opening 1481 that is provided with an opening-closing mechanism and disposed at an upstream side in the direction of the airflow generated when the rotating member 147 rotates in direction a, and the second opening 1482 that is provided with an opening-closing mechanism and disposed at a downstream side in the direction of the airflow generated when the rotating member 147 rotates in direction a.

An airflow that passes through the other opening 144 in the partitioning member 145 in the upward direction is not necessary for the purpose of cooling the developing unit 141. However, when, for example, the developing device 14 is contaminated with the developer, the airflow that has passed through the opening 144 in the upward direction enables dust including the developer that floats around the developing unit 141 to be discharged to the back (B) region through the openings 1481 and 1491. In this case, if the opening 143 is open, the air around the developing unit 141 may be unnecessarily agitated by the airflow that has passed through the opening 143, and there is a risk that dust will be scattered. Therefore, the opening 143 may be opened and the opening 144 may be closed in the cooling operation, and the opening 143 may be closed and the opening 144 may be opened in the decontamination operation.

When the rotating member 147 rotates in direction a, a vertically upward airflow is generated by the rotating member 147. Accordingly, when the first opening 1481 and the third opening 1491 are closed and the second opening 1482 and the fourth opening 1492 are open, an airflow that flows from the back (B) region to the front (F) region is generated in the developing device 14, that is, in the space accommodating the developing unit 14, as shown by the broken line arrow in FIG. 4. The airflow flows from the back (B) region and passes through the openings 1482 and 1492. Then, the airflow passes through the opening 142 in the downward direction, and flows through the space in the developing device 14 along the broken line. At this time, when, for example, dew is formed in the developing device 14, the external air that has entered from the back (B) region serves to reduce dew formation. In this case, the locations of the openings may be described in relation to the direction of the airflow as follows: The second partitioning member 149 has the third opening 1491 that is provided with an opening-closing mechanism and disposed at the downstream side in the direction of the airflow generated when the rotating member 147 rotates in direction a, and the fourth opening 1492 that is provided with an opening-closing mechanism and disposed at an upstream side in the direction of the airflow generated when the rotating member 147 rotates in direction a.

Figure 5:
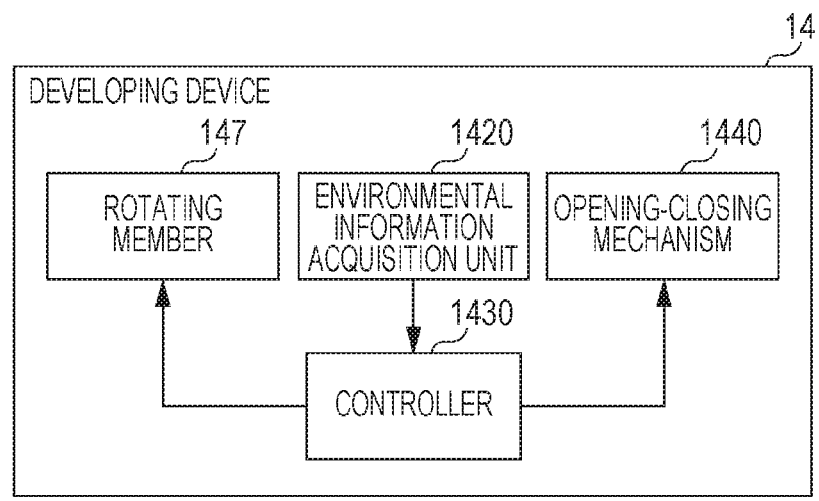
FIG. 5 is a block diagram illustrating the functional configuration of the image forming apparatus.

FIG. 5 is a block diagram illustrating the functional configuration of the developing device 14. The functions illustrated in FIG. 5 are realized by cooperative operation of the developing device 14 and the controller 110. The rotating member 147 generates an airflow having a vector in a direction that crosses the longitudinal direction of the developing unit 141. An environmental information acquisition unit 1420 acquires environmental information of the developing device 14. The environmental information may be the temperature measured by the temperature sensor 9, the humidity measured by the humidity sensor 10, or the accumulated developing period determined by the controller 110. The accumulated developing period serves as an index that shows the level of contamination of the developing device 14 with the developer. The controller 1430 controls an opening-closing mechanism 1440 for each of the openings 1481, 1482, 1491, and 1492 and the rotating member 147 in accordance with the acquired environmental information. More specifically, when the temperature included in the environmental information of the developing device 14 exceeds a threshold, the controller 1430 rotates the rotating member 147 in direction a, opens the first opening 1481 and the third opening 1491, and closes the second opening 1482 and the fourth opening 1492. Also, when the level of contamination with the developer included in the environmental information of the developing device 14 exceeds a threshold, the controller 1430 rotates the rotating member 147 in direction a, opens the first opening 1481 and the third opening 1491, and closes the second opening 1482 and the fourth opening 1492. Furthermore, when the humidity included in the environmental information of the developing device 14 exceeds a threshold, the controller 1430 rotates the rotating member 147 in direction a, closes the first opening 1481 and the third opening 1491, and opens the second opening 1482 and the fourth opening 1492.

The above-described exemplary embodiment may be modified as follows.

The object to be subjected to the cooling operation, the operation of reducing contamination with the developer, or the operation of reducing dew formation is not limited to the developing unit, and may be another object that has a possibility of generating heat, being contaminated, or having dew formed thereon. For example, the object may instead be a power supply mechanism, a substrate, or an inkjet mechanism of an inkjet printer. In other words, an airflow controlling device according to another aspect of the present invention may include a rotating member, a first partitioning member, and a second partitioning member. The rotating member rotates in a predetermined direction to generate an airflow. The first partitioning member is disposed between an object and the rotating member, and has a first opening and a second opening. The first opening is provided with an opening-closing mechanism and disposed at an upstream side in a direction of the airflow generated when the rotating member rotates in the predetermined direction. The second opening is provided with an opening-closing mechanism and disposed at a downstream side in the direction of the airflow generated when the rotating member rotates in the predetermined direction. The second partitioning member is disposed between the object and an external space, and has a third opening and a fourth opening. The third opening is provided with an opening-closing mechanism and disposed at a downstream side in the direction of the airflow generated when the rotating member rotates in the predetermined direction. The fourth opening is provided with an opening-closing mechanism and disposed at an upstream side in the direction of the airflow generated when the rotating member rotates in the predetermined direction.

The partitioning member 146 may be provided to block heat of radiation from the fixing device 6. However, the partitioning member 146 may be omitted.

In the exemplary embodiment, the rotating member 147 generates a vertically upward airflow by rotating in direction a. However, the rotating member 147 may instead generate a vertically downward airflow by rotating in the direction opposite to direction a. In this case, the opening-closing operation of the shutter members of the openings 1481, 1482, 1491, and 1492 is reversed from that in the above-described exemplary embodiment. There is no particular limitation as long as the first partitioning member 148 has the first opening 1481 that is provided with an opening-closing mechanism and disposed at an upstream side in the direction of the airflow generated when the rotating member 147 rotates in direction a, and the second opening 1482 that is provided with an opening-closing mechanism and disposed at a downstream side in the direction of the airflow generated when the rotating member 147 rotates in direction a, and the second partitioning member 149 has the third opening 1491 that is provided with an opening-closing mechanism and disposed at the downstream side in the direction of the airflow generated when the rotating member 147 rotates in direction a, and the fourth opening 1492 that is provided with an opening-closing mechanism and disposed at an upstream side in the direction of the airflow generated when the rotating member 147 rotates in direction a.

The direction of the airflow and the location of the rotating member 147 are also not limited to those in the exemplary embodiment. For example, the rotating member 147 may be provided at one side of the image forming apparatus 100 (for example, the right side when viewed from a user standing in front of the image forming apparatus), and an airflow may be caused to flow basically between the other side of the image forming apparatus 100 (for example, the left side) and the one side.

The present invention may also be provided in the form of a program for causing the computer to function as the developing device, or a recording medium that stores the program. The program according to an exemplary embodiment of the present invention may be downloaded into a computer through a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:
   a developing unit;
   a rotating member that rotates in a predetermined direction to generate an airflow in a space that accommodates the developing unit;
   a first partitioning member disposed between the developing unit and the rotating member and having a first opening and a second opening, the first opening being provided with an opening-closing mechanism and disposed at an upstream side in a direction of the airflow generated when the rotating member rotates in the predetermined direction, the second opening being provided with an opening-closing mechanism and disposed at a downstream side in the direction of the airflow generated when the rotating member rotates in the predetermined direction; and
   a second partitioning member disposed between the developing unit and an external space and having a third opening and a fourth opening, the third opening being provided with an opening-closing mechanism and disposed at a downstream side in the direction of the airflow generated when the rotating member rotates in the predetermined direction, the fourth opening being provided with an opening-closing mechanism and disposed at an upstream side in the direction of the airflow generated when the rotating member rotates in the predetermined direction.

2. The developing device according to claim 1, further comprising:
   a controller that controls the opening-closing mechanisms and the rotating member in accordance with environmental information of the developing device.

3. The developing device according to claim 2, wherein the environmental information of the developing device includes a temperature, and
   wherein the controller rotates the rotating member in the predetermined direction, opens the first opening and the third opening, and closes the second opening and the fourth opening when the temperature exceeds a threshold.

4. The developing device according to claim 3, wherein the environmental information of the developing device includes a level of contamination with developer, and
   wherein the controller rotates the rotating member in the predetermined direction, opens the first opening and the third opening, and closes the second opening and the fourth opening when the level of contamination exceeds a threshold.

5. The developing device according to claim 4, wherein the environmental information of the developing device includes a humidity, and
   wherein the controller rotates the rotating member in the predetermined direction, closes the first opening and the third opening, and opens the second opening and the fourth opening when the humidity exceeds a threshold.

6. The developing device according to claim 3, wherein the environmental information of the developing device includes a humidity, and
   wherein the controller rotates the rotating member in the predetermined direction, closes the first opening and the third opening, and opens the second opening and the fourth opening when the humidity exceeds a threshold.

7. The developing device according to claim 2, wherein the environmental information of the developing device includes a level of contamination with developer, and
   wherein the controller rotates the rotating member in the predetermined direction, opens the first opening and the third opening, and closes the second opening and the fourth opening when the level of contamination exceeds a threshold.

8. The developing device according to claim 7, wherein the environmental information of the developing device includes a humidity, and
   wherein the controller rotates the rotating member in the predetermined direction, closes the first opening and the third opening, and opens the second opening and the fourth opening when the humidity exceeds a threshold.

9. The developing device according to claim 2, wherein the environmental information of the developing device includes a humidity, and
   wherein the controller rotates the rotating member in the predetermined direction, closes the first opening and the third opening, and opens the second opening and the fourth opening when the humidity exceeds a threshold.

10. An image forming apparatus comprising:
    an image carrier;
    a charging device that charges the image carrier;
    an exposure device that forms an electrostatic latent image by exposing the image carrier charged by the charging device with light in accordance with image data;
    the developing device according to claim 1 that develops the electrostatic latent image formed by the exposure device;
    a transfer device that transfers the image developed by the developing device onto a medium; and
    a fixing device that fixes the image transferred onto the medium by the transfer device to the medium.

11. The image forming apparatus according to claim 10, wherein the second partitioning member is a portion of a housing of the image forming apparatus.

12. An airflow controlling device comprising:
    a rotating member that rotates in a predetermined direction to generate an airflow;
    a first partitioning member disposed between an object and the rotating member and having a first opening and a second opening, the first opening being provided with an opening-closing mechanism and disposed at an upstream side in a direction of the airflow generated when the rotating member rotates in the predetermined direction, the second opening being provided with an opening-closing mechanism and disposed at a downstream side in the direction of the airflow generated when the rotating member rotates in the predetermined direction; and
    a second partitioning member disposed between the object and an external space and having a third opening and a fourth opening, the third opening being provided with an opening-closing mechanism and disposed at a downstream side in the direction of the airflow generated when the rotating member rotates in the predetermined direction, the fourth opening being provided with an opening-closing mechanism and disposed at an upstream side in the direction of the airflow generated when the rotating member rotates in the predetermined direction.

* * * * *